(12) United States Patent
Nelson et al.

(10) Patent No.: US 8,607,677 B2
(45) Date of Patent: Dec. 17, 2013

(54) METHOD AND APPARATUS FOR ANVIL PRUNER AND LOPPER WITH SHOCK ABSORBING FEATURE

(75) Inventors: Linn E. Nelson, Portland, OR (US); Karl H. Zeller, Portland, OR (US)

(73) Assignee: Barnel International, Inc., Portland, OR (US)

( * ) Notice: Subject to any disclaimer, the term of this patent is extended or adjusted under 35 U.S.C. 154(b) by 615 days.

(21) Appl. No.: 12/428,435

(22) Filed: Apr. 22, 2009

(65) Prior Publication Data

US 2010/0064526 A1 Mar. 18, 2010

Related U.S. Application Data

(63) Continuation-in-part of application No. 12/211,751, filed on Sep. 16, 2008, now abandoned.

(51) Int. Cl.
*B26B 17/00* (2006.01)

(52) U.S. Cl.
USPC .................................. 83/13; 30/186; 30/244

(58) Field of Classification Search
USPC ......... 30/134, 135, 244, 254, 258, 186; 83/13
See application file for complete search history.

(56) References Cited

U.S. PATENT DOCUMENTS

| 530,221 | A | * | 12/1894 | Effinger et al. ................. 30/188 |
| 936,146 | A | | 10/1909 | Morse |
| 1,458,878 | A | | 6/1923 | Dexter |
| 2,574,354 | A | * | 11/1951 | Smith ............................ 30/186 |
| 2,775,032 | A | | 12/1956 | Sorensen |
| 3,323,209 | A | * | 6/1967 | Brill, Jr. ........................ 30/192 |
| 3,771,399 | A | * | 11/1973 | Aterianus ...................... 83/348 |
| 3,902,469 | A | * | 9/1975 | Scott, Jr. ................. 123/406.69 |
| 4,858,324 | A | | 8/1989 | Wiech, Jr. |
| 5,170,559 | A | | 12/1992 | Orthey et al. |
| 5,461,784 | A | | 10/1995 | Baron |
| 5,471,745 | A | | 12/1995 | Wendell |
| 5,673,487 | A | | 10/1997 | Malagnoux |
| 6,000,307 | A | * | 12/1999 | Aamodt ........................... 83/13 |
| 6,308,421 | B1 | | 10/2001 | Wang |
| 6,634,105 | B2 | | 10/2003 | Lindermeir |
| 7,182,595 | B2 | | 2/2007 | Smith et al. |

* cited by examiner

*Primary Examiner* — Stephen Choi
(74) *Attorney, Agent, or Firm* — patenttm.us

(57) ABSTRACT

A shock absorbing anvil pruner/lopper comprises a cutting blade and a shock absorbing anvil member with a compound action tang. The anvil member includes a liner member for engagement with the blade and a shock absorber in relation to the liner member, whereupon on engagement of the blade with the liner member during a cutting operation, the shock absorber will compress or otherwise absorb some of the force, providing for less physical shock being transmitted to the user through the pruner/lopper handles.

15 Claims, 10 Drawing Sheets

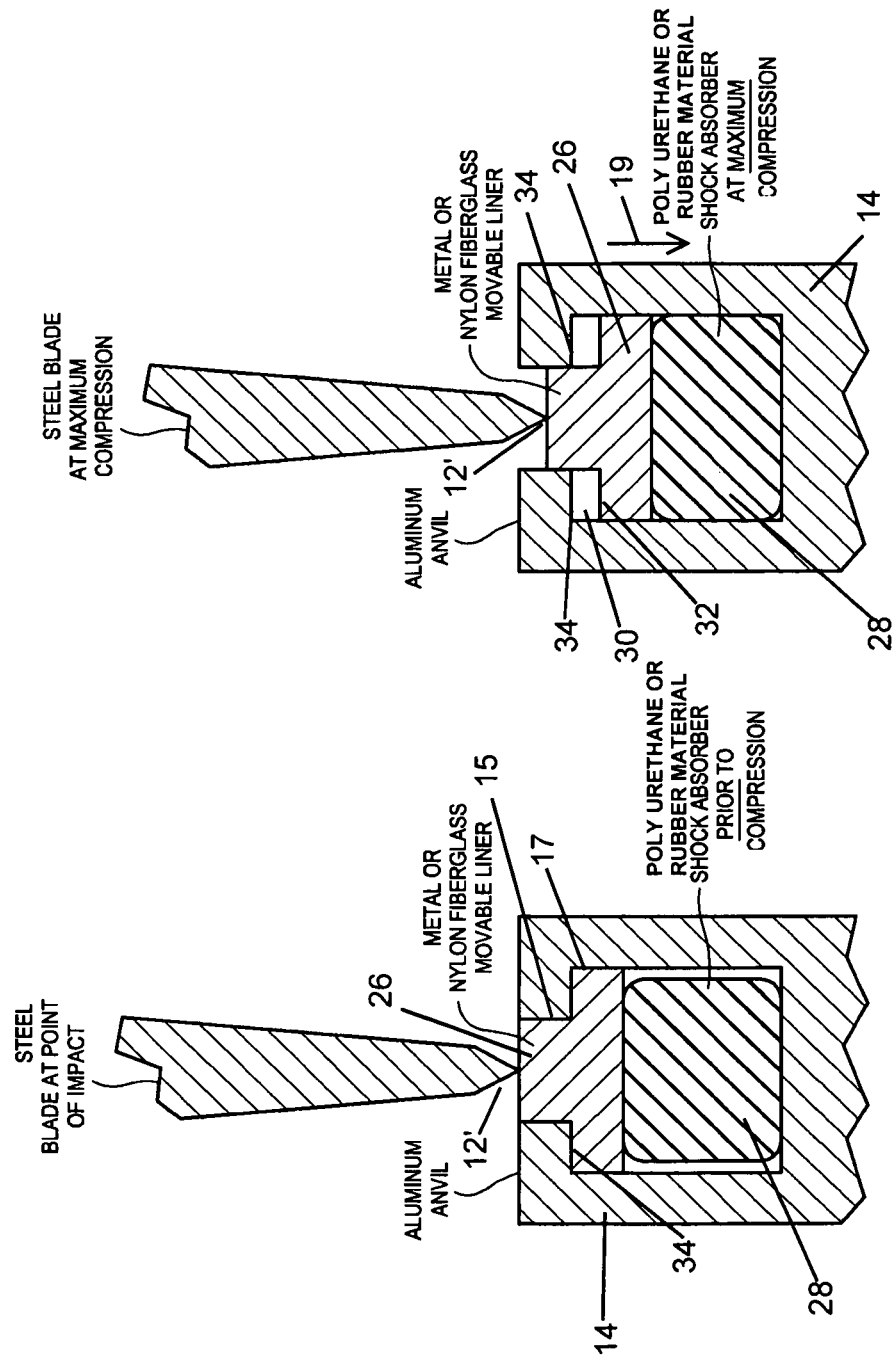

# METHOD AND APPARATUS FOR ANVIL PRUNER AND LOPPER WITH SHOCK ABSORBING FEATURE

CROSS-REFERENCE TO RELATED APPLICATIONS

This application is a continuation-in-part of U.S. patent application Ser. No. 12/211,751 filed Sep. 16, 2008.

BACKGROUND OF THE INVENTION

This invention relates to tools, and more particularly to anvil type pruners and loppers with shock absorbing features.

Anvil type pruners and loppers, where a cutting blade is moved down against an anvil portion with a branch being cut therebetween, are highly effective.

However, the impact of the blade to the anvil, especially when cutting hard or thick branches or the like, can result in a jarring physical shock, which is transmitted to the user's hands and arms. Such physical shock can lead to user fatigue or increase the likelihood of repetitive motion injuries and carpal tunnel syndrome.

Further, with an anvil type pruner/lopper, where the blade meets an anvil face the blade wears over time through use and the resulting wear can result in a gap between anvil and blade, causing a compromised cut which can, for example, leave a string of bark when cutting a branch. This is undesirable because a clean cut requirement is important for the longevity of a tree being pruned.

SUMMARY OF THE INVENTION

In accordance with the invention, an anvil type pruner/lopper is provided with a shock absorbing feature to dampen the physical shock between the blade and anvil when completing a cut.

Further in accordance with the invention, an anvil type pruner/lopper provides adjustment of the blade to anvil contact to accommodate wear over time while still providing a clean cut.

Accordingly, it is an object of the present invention to provide an improved anvil pruner/lopper which promotes clean cuts.

It is a further object of the present invention to provide an improved anvil pruner/lopper with shock absorbing features built in along with promoting clean cuts.

It is yet another object of the present invention to provide an improved anvil pruner/lopper with a shock absorber provided to the anvil portion for reduction of physical shock from cutting operations.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is a sectional view thereof taken along line 2-2 of FIG. 1;

FIG. 3 is a view in accordance with FIG. 2, illustrating shock absorbing effect;

DETAILED DESCRIPTION

The system according to a preferred embodiment of the present invention comprises an anvil pruner/lopper having a shock absorbing feature.

Figure 1:
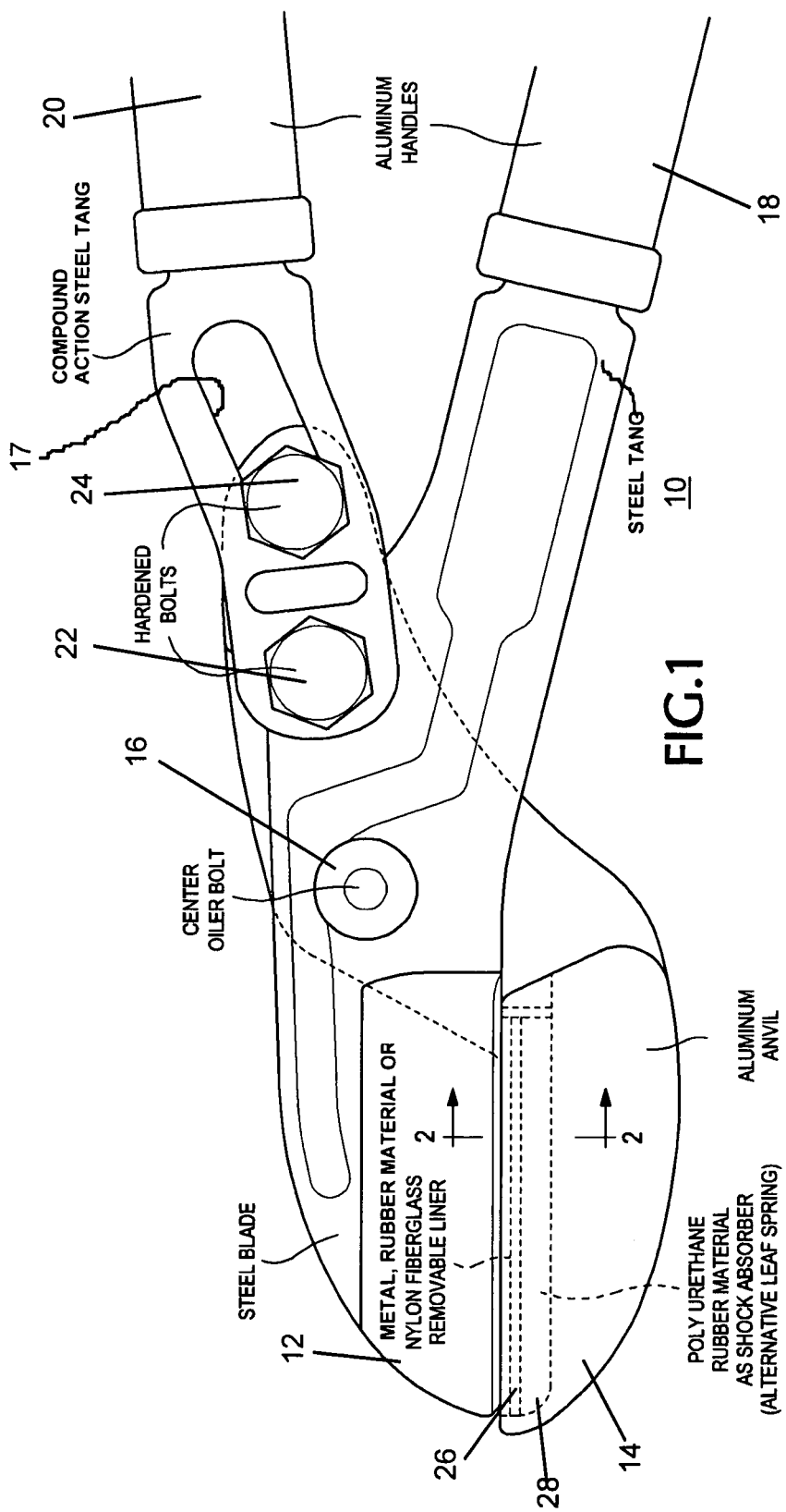
FIG. 1 is a partial side view of an anvil type pruner/lopper with shock absorbing features.

Referring to FIG. 1, a partial side view of an anvil type pruner/lopper 10 with shock absorbing features, the pruner/lopper comprises a blade portion 12 and anvil portion 14, which cooperate via pivot 16 to open and close relative to one another by pivoting around the center axis of pivot 16. Blade portion 12 mounts to a handle 18, while anvil portion 14 mounts to handle 20, for example, by use of bolts 22, 24 for the case of portion 14. The bolts cooperate with portion 14, portion 12 and a slot 17 in the steel tang inserted to handle 20 to provide a compound action for enabling cuts with less strength required of the user. The compound function creates greater travel of the handle without measurable blade movement that ultimately equates to increased force at the jaws of the pruner/lopper without the user having to exert more force. The compound action tang that pivots on the two bolts adds to the strength of the overall tool and reduces field breakage. The handles suitably extend a sufficient length to provide an operative pruner/lopper functioning. An anvil cutting base 26 with shock absorbing portion 28 mount within anvil portion 14, whereby cutting base 26 is positioned to contact with blade portion 12 when the pruner/lopper is in a closed position (as illustrated in FIG. 1).

Referring now to FIG. 2, a sectional view taken along line 2-2 of FIG. 1, with the pruner/lopper in a closed or cutting configuration, the cutting blade surface 12' of blade portion 12 meets and contacts a corresponding surface of anvil cutting base 26. Below cutting base 26, a shock absorbing member 28 is provided. Anvil portion 14 is formed so as to provide a containment region to hold cutting base and shock absorbing member 28 in relative positions to each other and to the anvil portion.

The anvil portion has an interior region that receives anvil cutting base and shock absorbing member 28 therein. In the illustrated embodiment, anvil portion 14 has a central opening slot 15 of a first width, with an interior region 17 of greater width. A stepped profile is provided by an upper ledge 34 of the anvil portion 14 and anvil cutting base 26 has a corresponding profile portion 32 to interact therewith to define an upper extension limit to the cutting base relative to the interior profile. In the illustrated embodiment, the profiles are of substantially right angle edges, but other profiles may be employed, whether with sharply defined edges or smooth or curved edges.

Referring now to FIG. 3, a view in accordance with FIG. 2, illustrating shock absorbing effect, as the pruner/lopper handles are moved further to a fully closed or cutting position, blade portion 12' will press in the direction of arrow 19 against anvil cutting base 26. Shock absorbing member 28 will thereby compress somewhat as illustrated at 28' whereby anvil cutting base 26 may move inwardly of the anvil base, providing a shock absorbing function while still enabling cutting action between the blade 12' and anvil cutting base 26. A space 30 may suitably appear between the upper surface 32 of the anvil cutting base and the upper ledge 34 of the anvil portion 14. Upon release of the pressure of blade 12' against anvil cutting base 26, the shock absorbing member 28 will return to substantially its original configuration (as in FIG. 2), causing the anvil cutting base 26 profile portion 32 to move back into it engaging position with anvil portion 14 upper ledge 34. Shock absorbing member 28 is a replaceable part.

Figure 4:
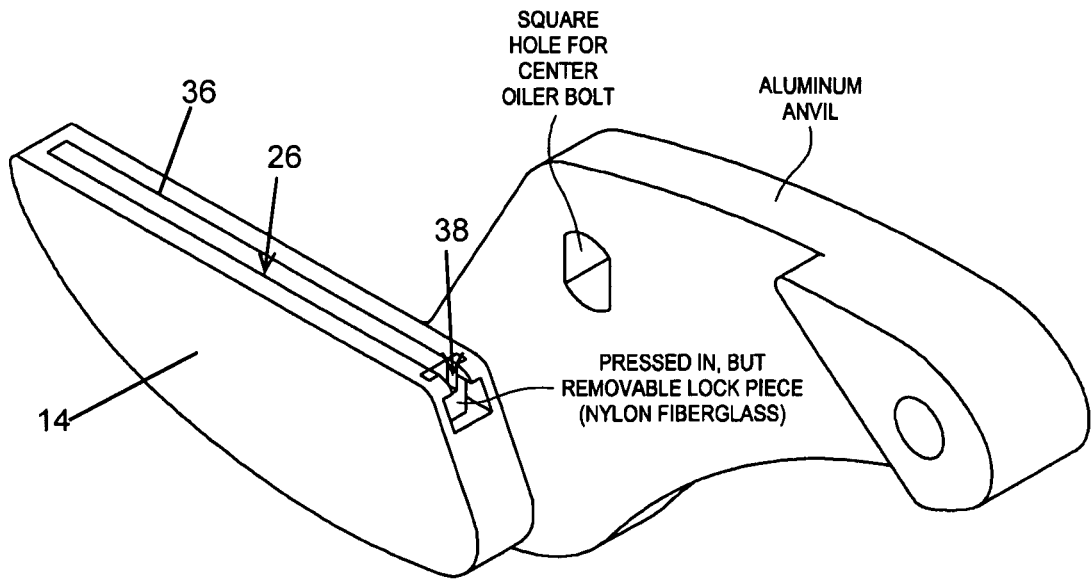
FIG. 4 is a perspective view of the anvil portion of the pruner/lopper of FIG. 1.
Figure 5:
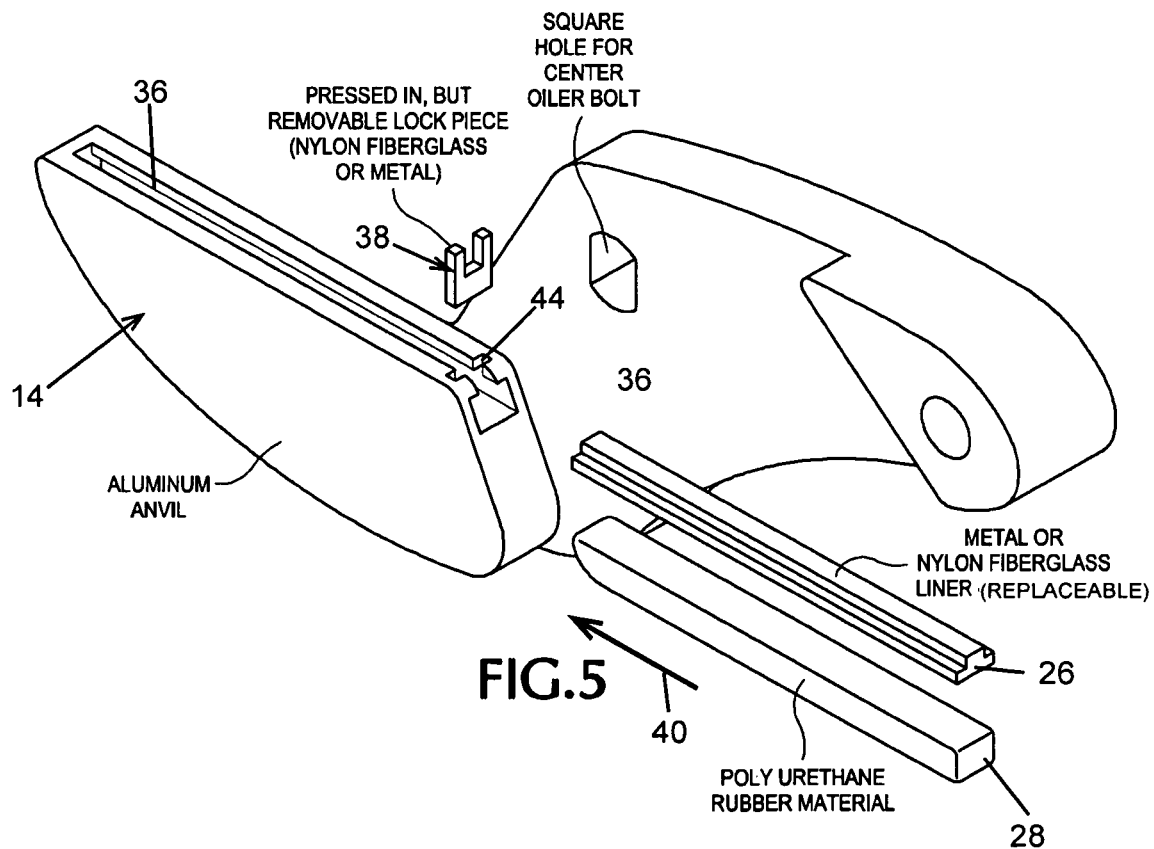
FIG. 5 is an exploded view of the anvil portion of FIG. 4, illustrating the components thereof.

Referring to FIGS. 4 and 5, a perspective view of a first embodiment of the anvil portion of the pruner/lopper of FIG. 1 and an exploded perspective view thereof, the anvil portion 14 includes a longitudinal slot 36 formed therein, having length sufficient to correspond at least to the length of the corresponding blade portion 12'. Interior of the anvil portion, the slot 36 is made of greater width than the width along the face of anvil portion 14, so as to provide space to accommodate placement of anvil cutting base 26 and shock absorbing member 28 therein.

Anvil cutting base 26 and shock absorbing member 28 suitably insert into the space define in anvil portion 14, in the direction of arrow 40, and are secured therein against unintended removal by key 38 which is inserted into a corresponding key slot 44 in anvil portion 14, to block removal thereof.

Thus, assembly is accomplished by inserting cutting base 26 and shock absorbing member 28 into the opening of anvil portion 14, followed by insertion of key 38. By reverse procedure, the cutting base and shock absorbing members can be removed for repair or replacement.

In a particular embodiment, blade portion 12 is made of steel, anvil portion 14 is of aluminum, pivot 16 comprises a center oiler bolt and handles 18, 20 comprises aluminum handle members. Bolts 22, 24 are hardened bolts or other suitable fasteners that create a compound action in conjunction with the configuration and shape of the other portions of the device to enable reduction in the amount of strength required to complete a cut. The pivot 16 may comprise, for example, a center oiler bolt by Barnel International, Inc., Portland, Oreg. US, which includes an interior lubrication reservoir with lubrication channels to provide ongoing lubrication to the pivoting region and elements during use. The reservoir includes a refilling capability to replenish the lubrication as desired. Bolt 22 may also be such a center oiler bolt. Anvil cutting base 26 comprises nylon fiberglass and shock absorbing member 28 comprises poly urethane rubber material. The cutting base 26 may also be a metal member, or of other composition to provide an engagement surface to meet with the blade. Alternatively, shock absorbing member may be a leaf spring or other mechanical spring mechanism. Key 38 (which is optional) and may comprise nylon fiberglass, is sized to provide a friction fit to remain in place in absence of intentional removal forces being applied thereto.

Figure 6:
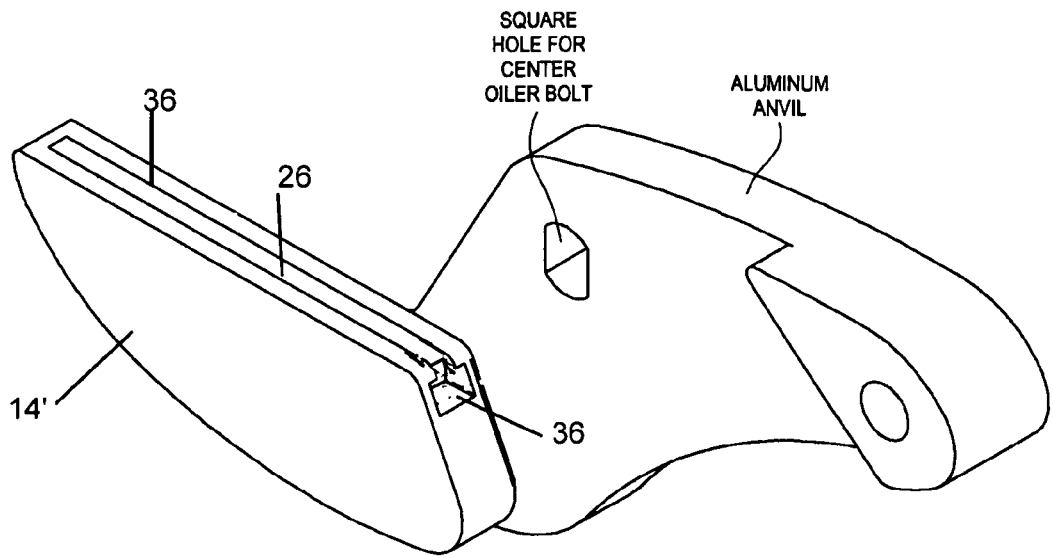
FIG. 6 is a perspective view of an alternate embodiment of the anvil portion of the pruner/lopper.
Figure 7:
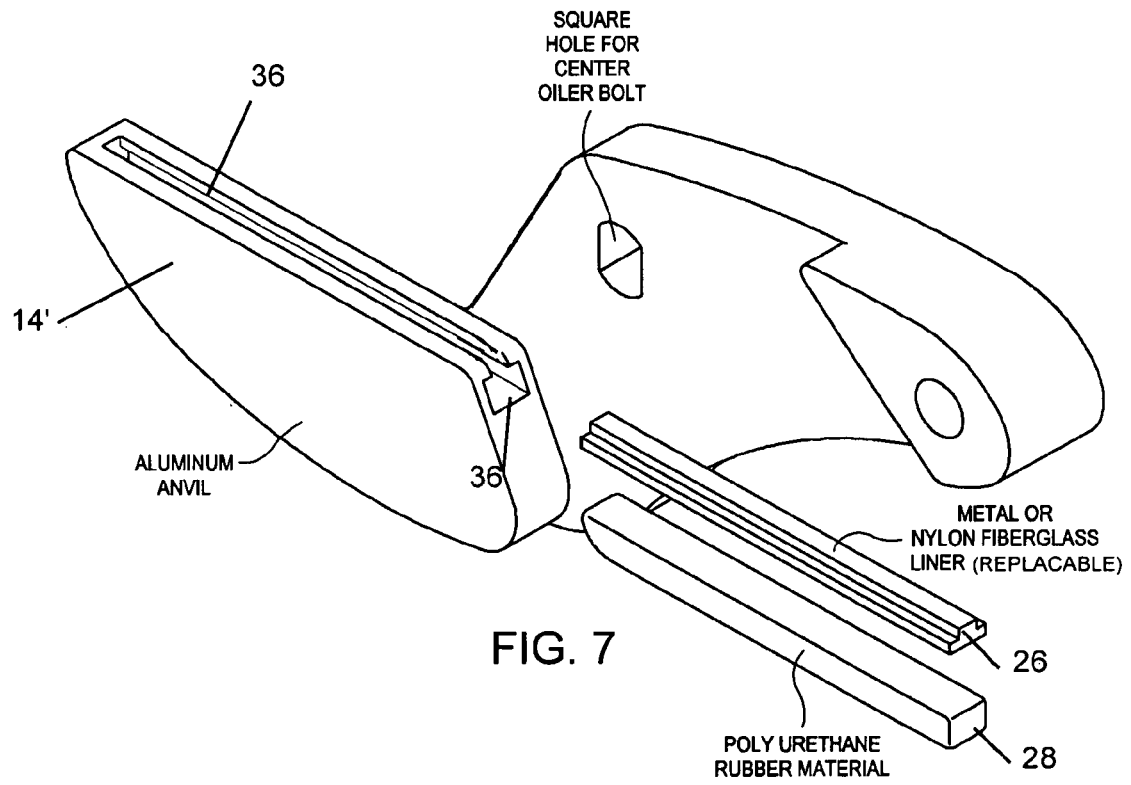
FIG. 7 is an exploded view of the anvil portion of FIG. 6, illustrating the components thereof.

Referring to FIGS. 6 and 7, an alternative embodiment of the shock absorbing anvil is illustrated. The embodiment of FIGS. 6 and 7 does not employ the key 38 for retaining the liner 26 and shock absorber 28 in the anvil 14'. Instead, this embodiment employs the shock absorbing member 28 to provide bias to maintain base 26 in position with the anvil 14'. In assembly, shock absorbing member 28 is compressed while base 26 and shock absorber 28 are inserted into the slot 36, or, base 26 is inserted first and the compressed shock absorber is inserted afterwards, or the shock absorber is inserted first, and while the shock absorber is compressed, the base 26 is inserted. In any of the above assembly modes, when the shock absorber compression is released, the shock absorber provides sufficient bias to maintain the base 26 within the anvil.

With the above embodiments, the shock absorber 28 and base 26 can suitably be replaced as desired, to accommodate wear. A complete replacement anvil with base 26 and shock absorber 28 installed therein may be provided as replacement parts.

Figure 8:
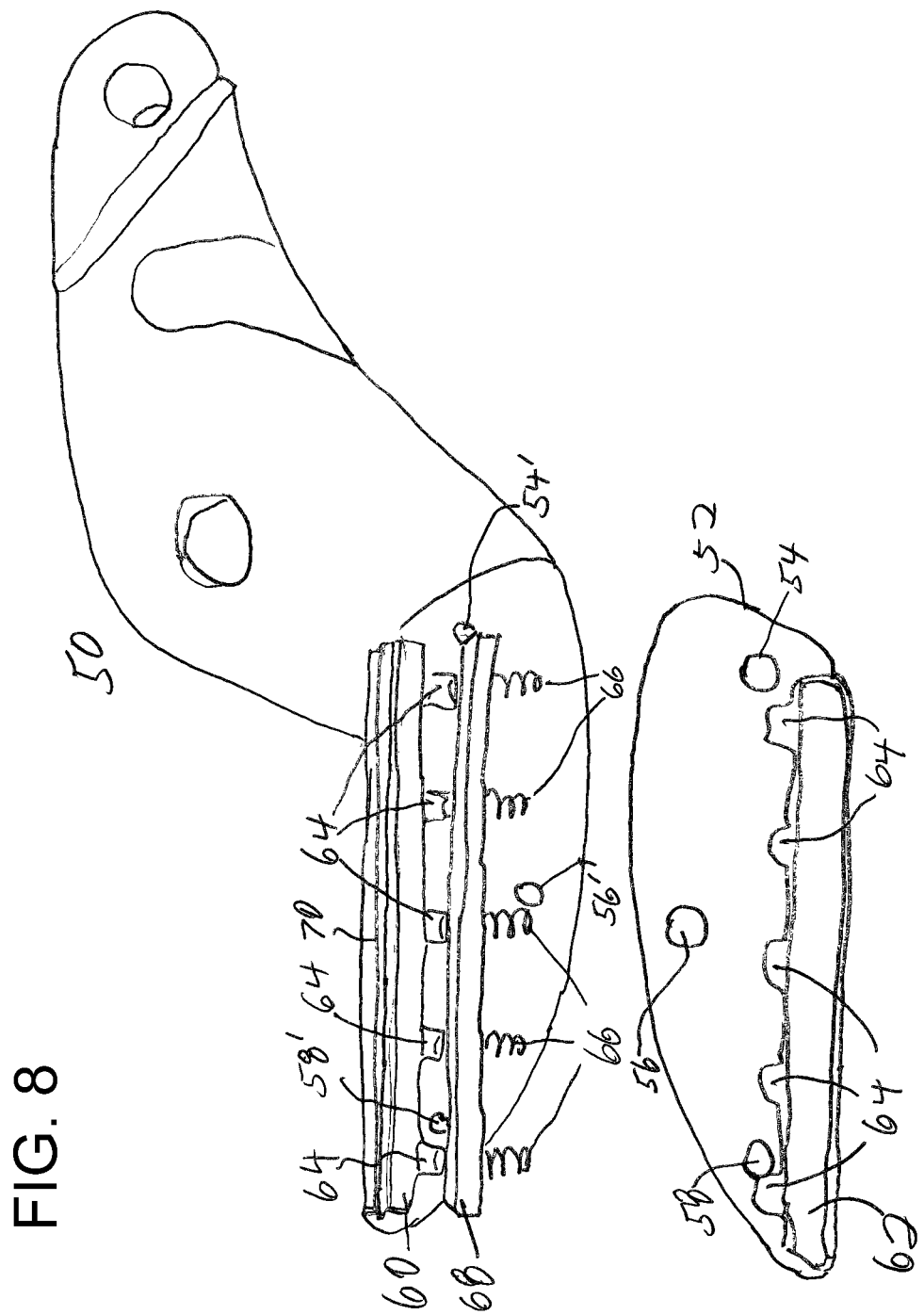
FIG. 8 is a side view of another embodiment.
Figure 9:
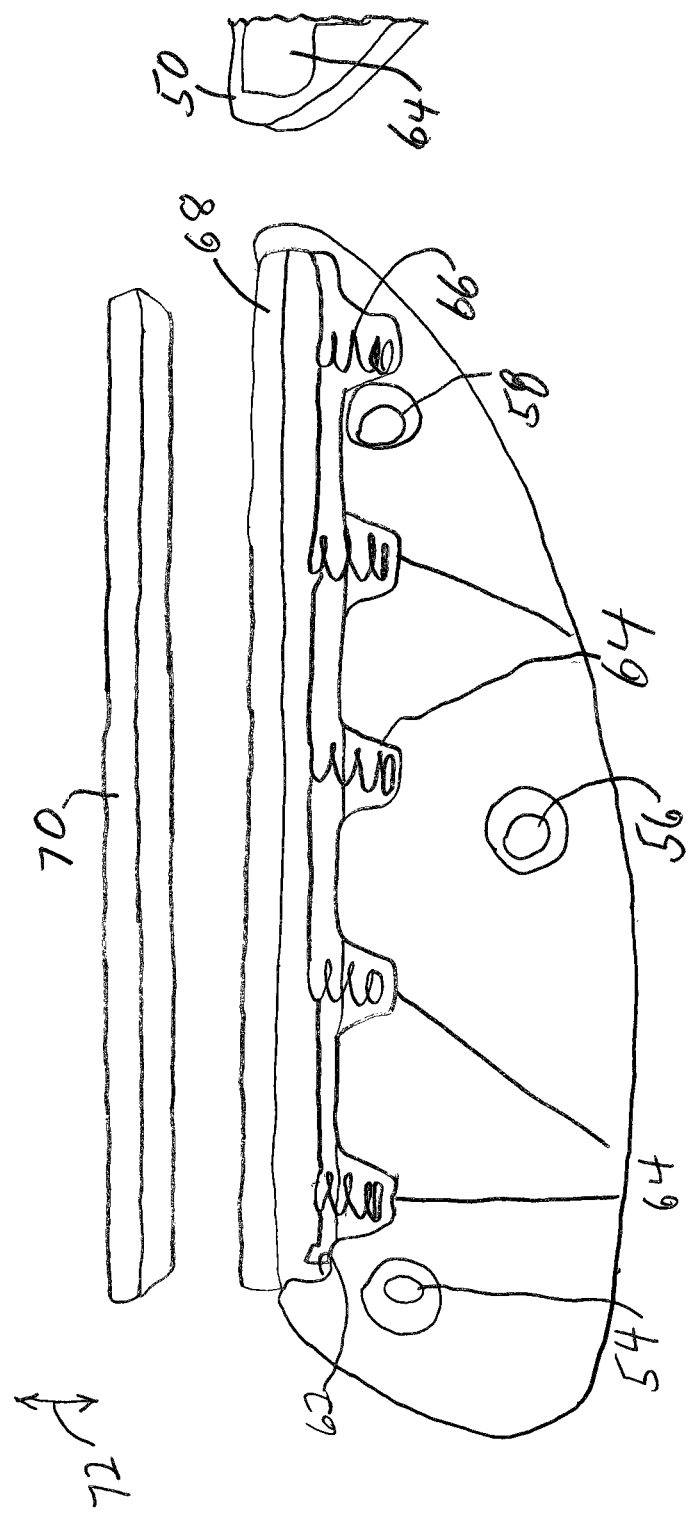
FIG. 9 is a close up of a portion of the embodiment of FIG. 8.

Referring to FIG. 8, a side view of a disassembled anvil portion of a preferred embodiment, the anvil portion comprises first and second head 50, 52, which are adapted for assembly to one another via bolts or other fasteners which are received in mounting holes 54, 54', 56, 56', 58 and 58'. Longitudinal slots 60, 62 are defined in the head portions, with plural recesses 64 extending downwardly from the slots to define spring receiving positions, adapted for positioning of springs 66 therein. Springs 66 are of sufficient length to extend beyond the top of the respective recesses 64, to biasedly engage shock absorbing portion 68, which is suitably a polyurethane flexible membrane. The face of portion 68 which engages the spring may be provided with receiving depressions for receiving the springs therein for ease of spacing and assembly. Slots 60, 62 define an interior space within the anvil head portions, such that shock absorbing portion 68 and a blade engaging plate 70 (shown in FIG. 9) will be received and contained within the space defined by the slots when heads 50, 52 are positioned face to face and secured to one another via bolts. The size of the space defined by the slots is such that upward and downward movement in the direction of line 72 is possible for the plate 70 and membrane/springs 68, 66. The springs bias the membrane and plate to engage the upper surface of the slots 60, 62 in absence of downward pressure from the blade 74 (FIG. 11) when a cutting operation is performed.

Figure 10:
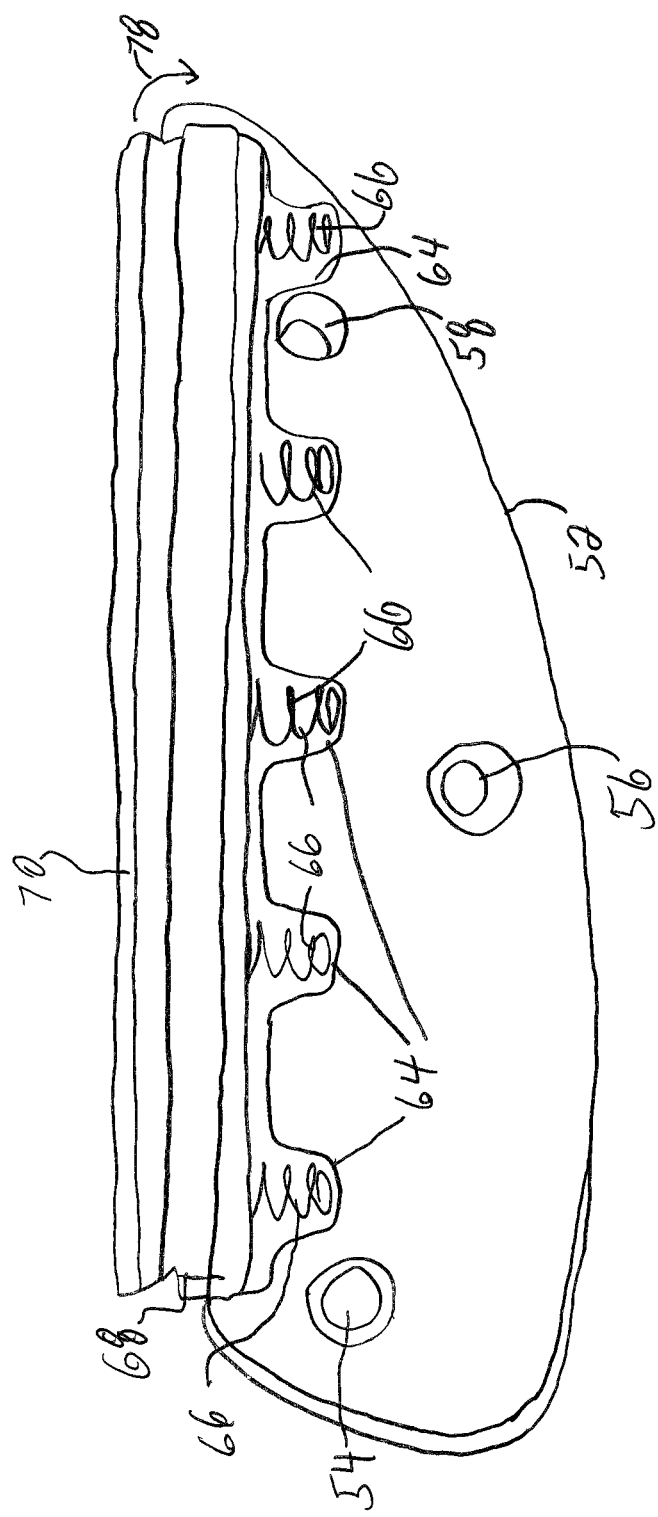
FIG. 10 is a close up of a portion of the embodiment of FIG. 8.

FIG. 10 illustrates the positioning of the springs 66, portion 68 and plate 70 within slots 60, 62, just prior to moving first and second heads 50, 52 together in face to face relation for assembly of the anvil portion. Plate 70 is angled upwardly slightly in this view, with the far longitudinal edge of the plate inserted into slot 62, and will be moved downwardly as indicated by arrow 78 for insertion of the near longitudinal face into the corresponding slot 62 of head 50.

Figure 11:
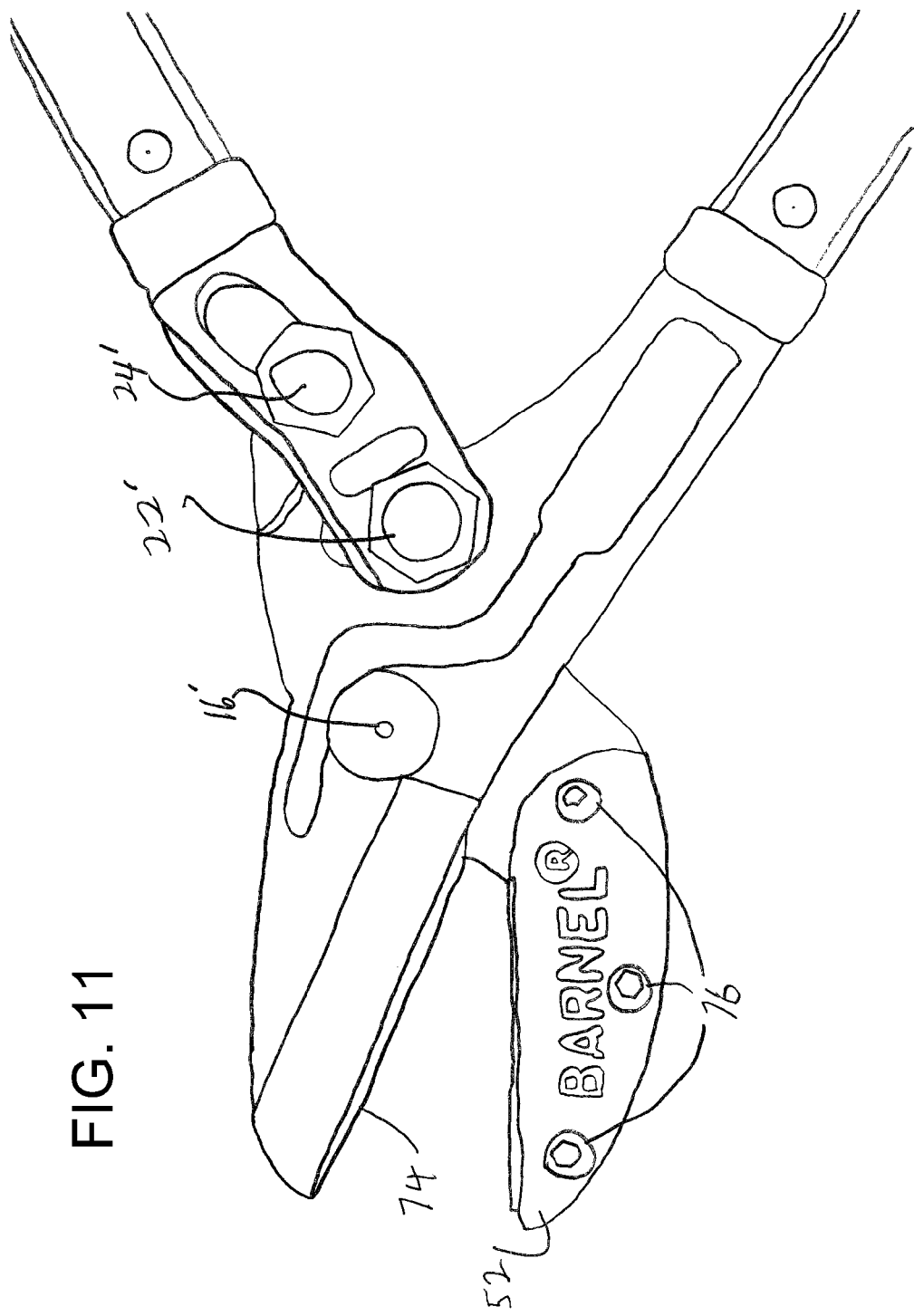
FIG. 11 is a side view of a pruner/lopper in accordance with FIG. 8 with the blade in the open position.
Figure 12:
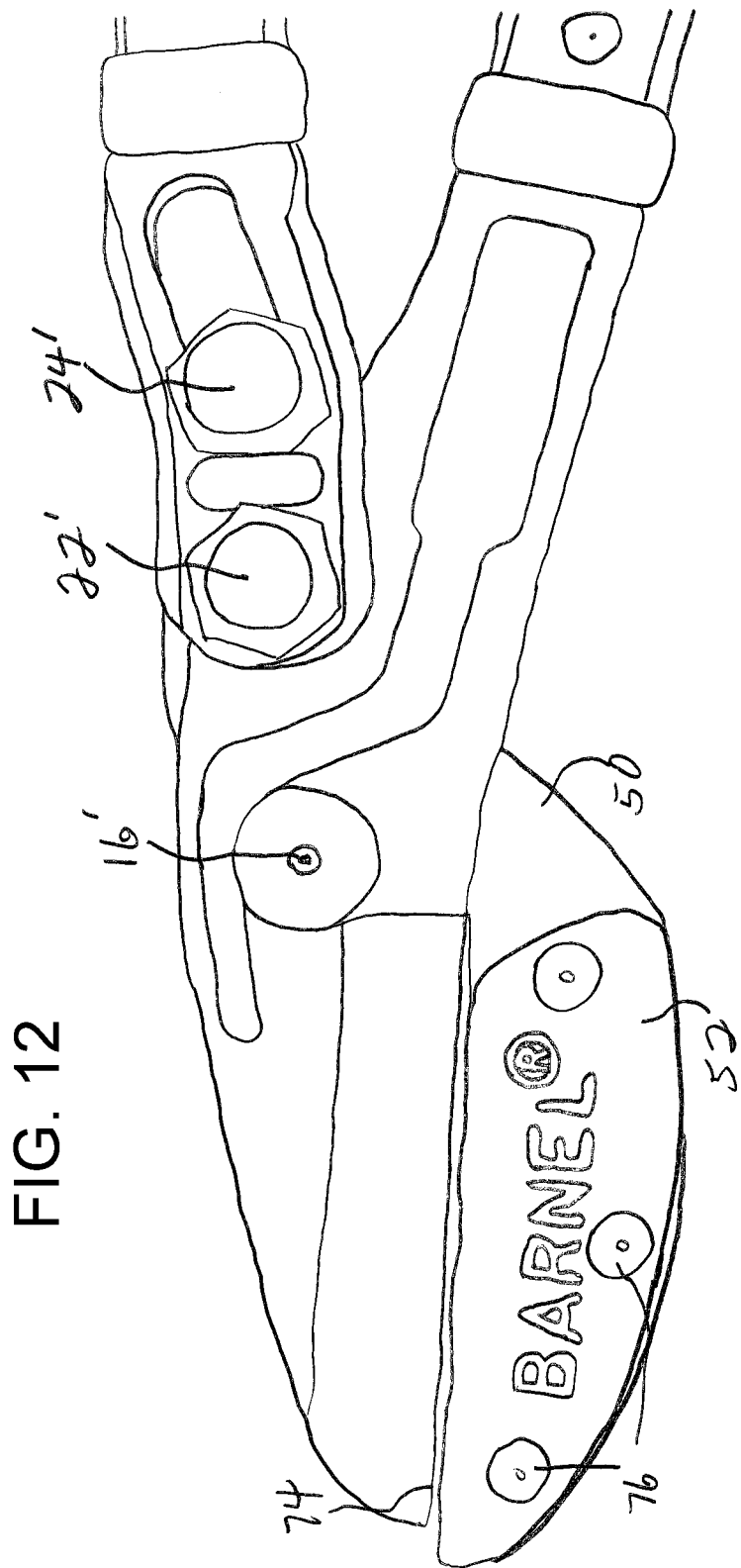
FIG. 12 is a side view of a pruner/lopper in accordance with FIG. 8 with the blade in the closed position.
Figure 13:
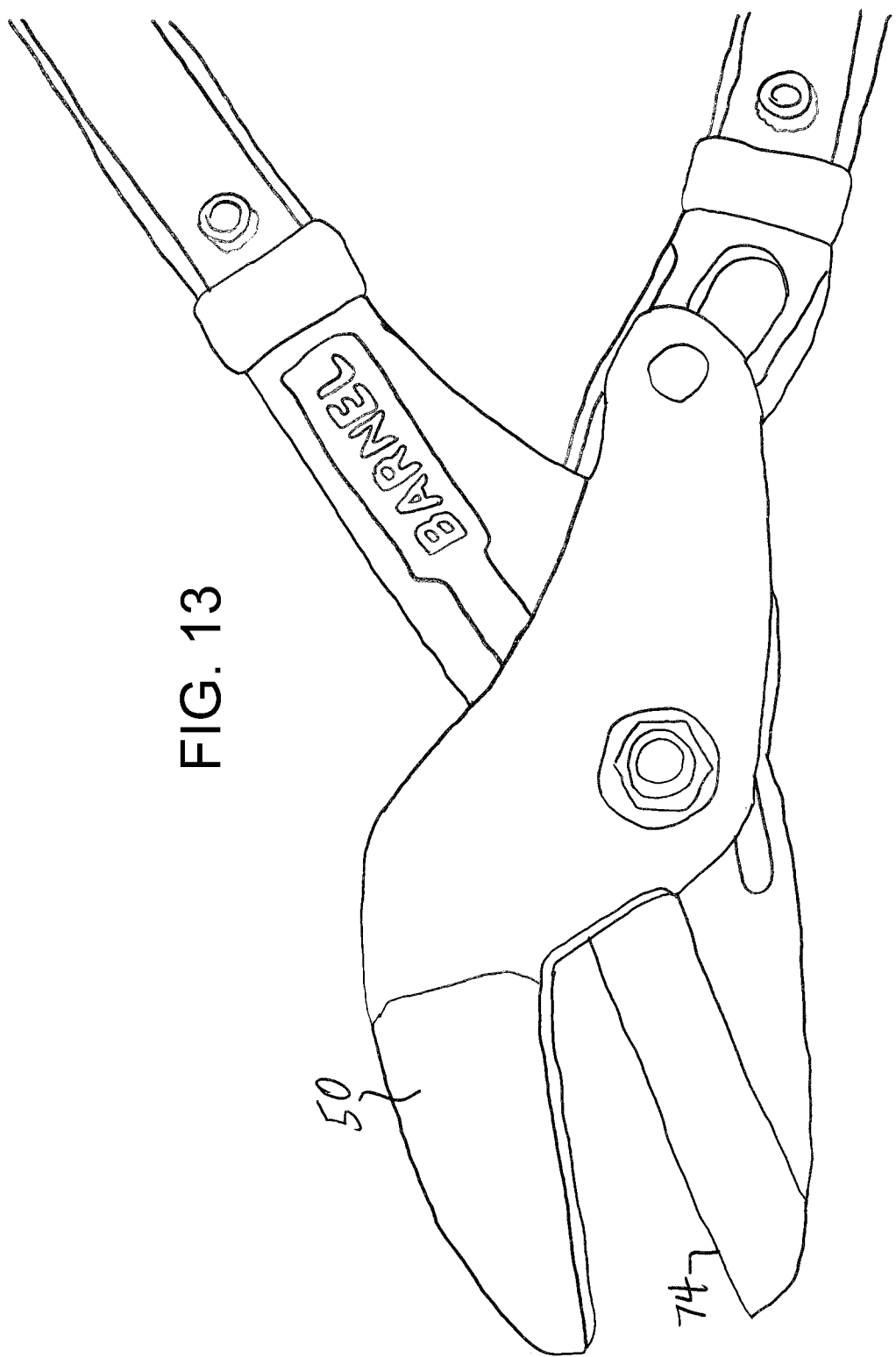
FIG. 13 is a view of the pruner/lopper of FIG. 10, from the opposite side thereof.

FIG. 11 illustrates an assembled configuration of the pruner/lopper (FIG. 13 illustrating the opposite side view of FIG. 11) with the pruner lopper in an open, ready to cut position, wherein portions 60, 62 are assembled face to face, secured by bolts 76, suitably received in threaded holes 54, 56, 58 of portion 60. Upon operation of the pruner/lopper, blade 74 is closed and will meet the upper face of engaging plate 70, and the combination of plate 70 and polyurethane flexible membrane 68 and springs 66, upon closure of the blade and during the cutting process, automatically adjusts (top to bottom) to the cutting edge of the blade 74. This adjustment is made possible by the 5 coil springs 66 embedded into the anvil cavity to deliver a precise adjustment of anvil plate 70 to the blade edge upon contact of the blade to anvil (FIG. 12). The action reflects an angular tilt pattern that ensures complete blade contact to anvil, which promotes clean cuts. Another advantage provided is that as the blade wears over time through use, the adjustment of the engaging plate-to-blade-contact provides a continued clean cut, unlike with prior art where as a blade wears over time, one ends up with compromised cuts as a result of blade to anvil gap that forms. Such gaps ultimately leave a string of bark when cutting a branch, for example. To resolve this in the prior art, the user must replace the blade and/or anvil portion to restore the clean cut requirement which is important for the longevity of the tree.

Accordingly, in accordance with the above description, an anvil type pruner/lopper is provided having shock absorbing capabilities, to provide a more comfortable cutting action, reduced operator fatigue and the like. The operation of the shock absorbing features results in less physical shock being transmitted through the handles of the pruner/lopper to the user's hands. Also, the compound action design of the anvil base tang provides desirable operational results.

The device promotes clean cuts, leaving no bark strings, etc., as a result of the liner 26 that operates as a cushioning device, as well as to promote ergonomic cuts. Use of the liner 26 also is less apt to dull the blade edge as compared with conventional anvil type cutting devices, but instead retains the longevity of the cutting edge. The blade edge remains ultra sharp given that it is not coming in contact with aluminum but instead with the liner which promotes clean cuts yet remains friendly with the blade coming in contact with it.

While plural embodiments of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An anvil pruner/lopper, comprising:
a cutting blade having lateral sides; and
an anvil member having a cutting blade engaging surface, wherein said cutting blade and anvil member cooperate together to effect cutting of a workpiece by passing of said cutting blade through a first side of the work piece as a result of pressing of a second side of the work piece against said anvil member and pressing of said cutting blade against the first side of the workpiece whereby the cutting blade contacts the anvil member cutting blade engaging surface to complete the cutting of the workpiece,
wherein said cutting blade and said anvil member are in movable pivotable relation to one another and the cutting blade operative to engage the cutting blade engaging surface of said anvil member in a position such that additional non-engaging surface portions of said anvil member exist laterally on each lateral side of said cutting blade, and wherein said anvil member provides shock absorbing during cutting operations said anvil member comprising at least one spring positioned in a cavity within said anvil member, said at least one spring pushing upwardly against a portion of said anvil member providing biasing of said anvil member portion toward said cutting blade,
wherein said anvil member comprises:
a cutting base adapted to engage with said cutting blade during a cutting operation; and
said at least one spring pushes against said cutting base in a direction toward said cutting blade during a cutting operation, providing cushioning to said cutting base,
and wherein said cavity comprises a space defined in said anvil member for receiving and maintaining said cutting base and said at least one spring therein.

2. The anvil pruner/lopper according to claim 1, wherein during a cutting operation, said cutting blade presses against said cutting base, which presses against and compresses said at least one spring.

3. The anvil pruner/lopper according to claim 1, wherein said space defined in said anvil member includes a profile and said cutting base includes a corresponding counterpart profile, and wherein said at least one spring provides a bias for providing engagement between said profiles in absence of cutting force from said cutting blade.

4. The anvil pruner/lopper according to claim 1, wherein said cutting base comprises a metal.

5. The anvil pruner/lopper according to claim 1, wherein said at least one spring comprises plural springs.

6. The anvil pruner/lopper according to claim 5, wherein said plural springs comprises a coil springs.

7. (The anvil pruner/lopper according to claim 1, wherein said cutting base comprises a poly urethane.

8. The anvil pruner/lopper according to claim 1, wherein said pruner/lopper effects a cutting operation by cutting through a workpiece on one side of the workpiece, cutting through the workpiece to meet the cutting blade engaging surface of the anvil member.

9. A method of providing a shock absorbing anvil pruner/lopper, comprising:
providing a cutting blade having lateral sides; and
providing an anvil member having a cutting blade engaging surface,
wherein said cutting blade and said anvil member are in movable pivotable relation to one another and the cutting blade operative to engage the cutting blade engaging surface of said anvil member in a position such that additional non-engaging surface portions of said anvil member exist laterally on each lateral side of said cutting blade, and wherein said anvil member is provided with shock absorbing function to absorb shock during cutting operations by operations of plural spring members positioned in a space defined in an interior portion of said anvil member,
wherein providing said anvil member comprises:
providing a cutting base adapted to engage with said cutting blade during a cutting operation; and
providing said cutting base in operative engagement with said plural spring members, whereby said plural spring members yieldingly urge said cutting base towards said cutting blade for providing cushioning to said cutting base,
and further comprising said anvil member space defined in the interior thereof is for receiving and maintaining said cutting base and said plural spring members therein.

10. The method according to claim 9, wherein during a cutting operation, said cutting blade presses against said cutting base, which presses against and compresses said plural spring members.

11. The method according to claim 9, wherein providing said space defined in said anvil member includes a profile and said cutting base is provided with a corresponding counterpart profile, and wherein said spring members provide a bias for providing engagement between said profiles in absence of cutting force from said cutting blade.

12. The method according to claim 9, wherein providing said cutting base comprises providing a cutting base that is at least partially a metal.

13. The method according to claim 9, wherein providing said cutting base comprises providing a poly urethane shock absorber.

14. The method according to claim 9, wherein providing said springs comprise plural coil springs.

15. The method according to claim 9, wherein the pruner/lopper effects a cutting operation by cutting through a workpiece on one side of the workpiece, cutting through the workpiece to meet the cutting blade engaging surface of the anvil member.

\* \* \* \* \*